Figure 1:
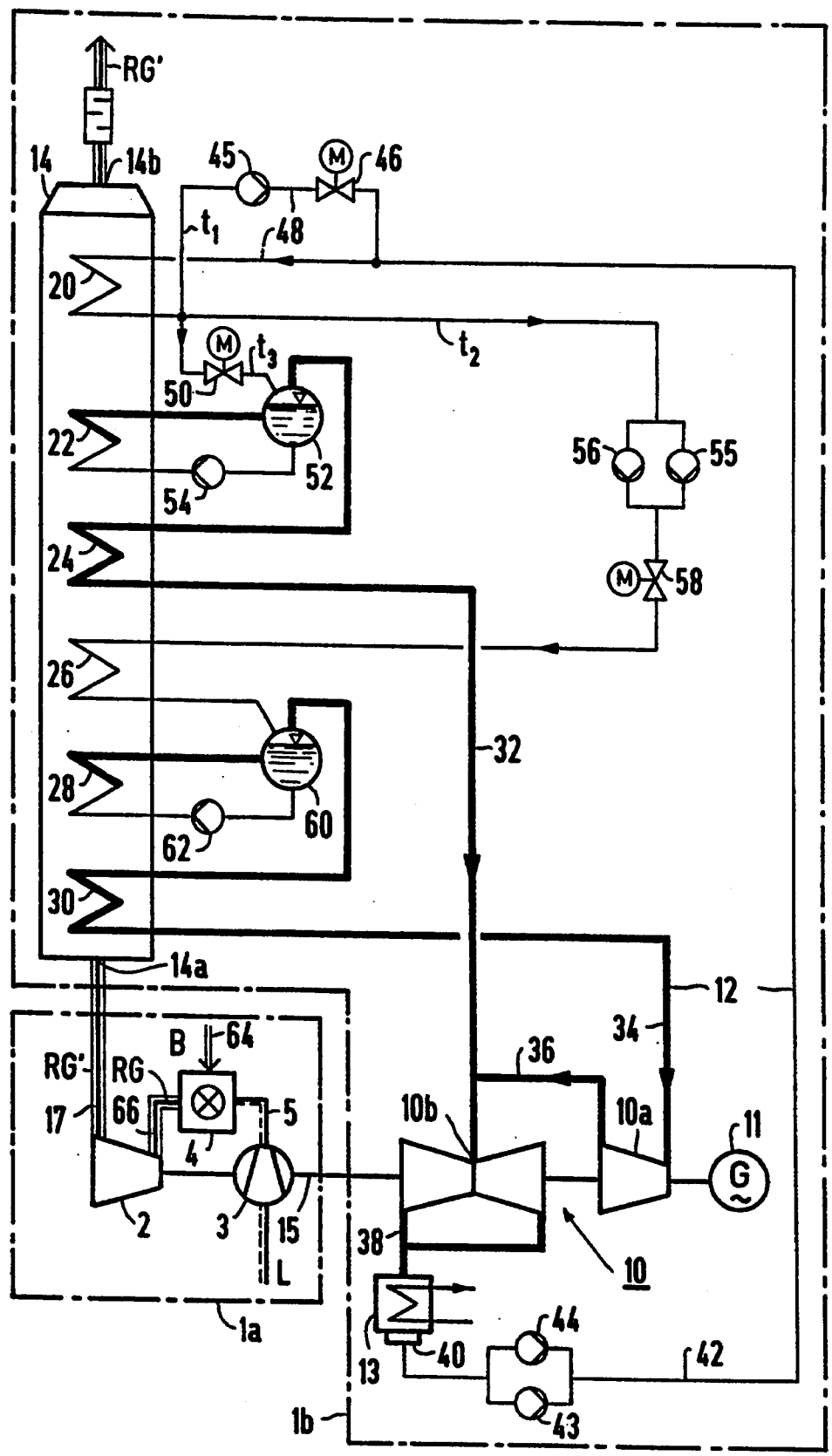

United States Patent [19]

Brückner et al.

[11] Patent Number: 5,369,950
[45] Date of Patent: Dec. 6, 1994

[54] METHOD FOR OPERATING A GAS AND STEAM TURBINE SYSTEM, AND GAS AND STREAM TURBINE SYSTEM OPERATING BY THE METHOD

[75] Inventors: Hermann Brückner, Uttenreuth; Erich Schmid, Marloffstein, both of Germany

[73] Assignee: Siemens Aktiengesellschaft, Munich, Germany

[21] Appl. No.: 104,672

[22] Filed: Aug. 10, 1993

[30] Foreign Application Priority Data

Aug. 10, 1992 [DE] Germany ............... 4226462

[51] Int. Cl.⁵ ....................................... F02C 6/18
[52] U.S. Cl. ........................... 60/39.182; 122/7 R
[58] Field of Search ............... 60/39.02, 39.07, 39.182; 122/7 R, 7 B

[56] References Cited

U.S. PATENT DOCUMENTS 4,501,233 2/1985 Kusaka .
4,799,461 1/1989 Shigenaka et al. ............... 122/7 R
4,841,722 6/1989 Bjorge ............... 60/39.182

FOREIGN PATENT DOCUMENTS 0148973 10/1987 European Pat. Off. .

*Primary Examiner*—Louis J. Casaregola
*Attorney, Agent, or Firm*—Herbert L. Lerner; Laurence A. Greenberg

[57] ABSTRACT

Method for operating a gas and steam turbine system without a feedwater tank, wherein heat contained in a pressure-relieved operating fluid of a gas turbine is utilized to produce steam for a steam turbine, includes the steps of preheating condensate flowing in a water-steam loop of the steam turbine; returning a first quantitative fraction of the preheated condensate in a loop for further preheating; and evaporating a second quantitative fraction of the preheated condensate; and a device for performing the foregoing method.

5 Claims, 2 Drawing Sheets

METHOD FOR OPERATING A GAS AND STEAM TURBINE SYSTEM, AND GAS AND STREAM TURBINE SYSTEM OPERATING BY THE METHOD

SPECIFICATION

The invention relates to a method for operating a gas and steam turbine system, wherein heat contained in the pressure-relieved operating medium of the gas turbine is utilized to generate steam for the steam turbine. The invention also relates to a gas and steam turbine system operated by the foregoing method.

In a gas and steam turbine system, the heat contained in the pressure-relieved flue gas of the gas turbine is used to generate steam for the steam turbine. Heat transfer occurs in a steam generator or waste heat boiler downstream from the gas turbine, as viewed in fluid flow direction through the system, heating surfaces in the form of tubes or banks of tubes, which are incorporated into the water-steam circulatory loop of the steam turbine, being disposed in this steam generator or waste heat boiler. The water-steam loop encompasses one or more pressure stages, each of the pressure stages having an evaporator heating surface and a superheater heating surface. One such gas and steam turbine system has become known heretofore from European Patent 0 148 973, for example.

In such a gas and steam turbine system, the water-steam loop typically includes a feedwater tank, wherein preheated, condensed steam from the steam turbine is collected and often also degassed. From this feedwater tank, preheated condensate, which is also referred to herein as feedwater, is fed to the evaporator system by means of a number of feedwater pumps corresponding to the number of pressure stages. Preheating of the condensate is performed in a condensate preheater connected to the feedwater tank and having heating surfaces which are often also located in the waste heat boiler. The feedwater tank thus acts as a buffer tank or intermediate reservoir for supplying feedwater to the evaporator systems located downstream therefrom. The introduction of a feedwater tank not only requires adjusting and monitoring of the temperature of the condensate at the inlet and outlet of the condensate preheater, but also adjusting and monitoring of the made-ready or provided quantity of feedwater and feedwater pressure, to prevent flash evaporation from occurring at the heating surface of the condensate preheater. The open or closed-loop, i.e., control or regulating, devices required therefor call for a major outlay in terms of process control and must be designed carefully, because the control variables influence one another.

In a degassing of the condensate in the feedwater tank, especially in a conventionally provided overpressure degassing, the feedwater is preheated at a slight overpressure to a temperature of approximately 120° C. or, in other words, to boiling temperature. This often requires an additional infeed of steam from the water-steam loop into the feedwater tank, so as to prevent the gases which are to be expelled from reentering into solution. If the degassing of the condensate takes place exclusively in a condenser downstream from the steam turbine, i.e., in the so-called hot well thereof, then the feedwater in the condensate preheater is preheated approximately to a temperature corresponding to that of the downstream evaporator stage. Regardless of whether the feedwater tank is operated with or without degassing, the overall efficiency of the system is limited only because, in both cases, only a limited cooling of the flue gas or exhaust gas emerging from the steam generator is achievable.

It is accordingly an object of the invention to provide a method for operating a gas and steam turbine system, and such a system operating in accordance with the method, wherein the mode of operation thereof is as simple as possible and is performed with minimal engineering or technical outlay.

With the foregoing and other objects in view, there is provided, in accordance with the invention, a method for operating a gas and steam turbine system without a feedwater tank, wherein heat contained in a pressure-relieved operating fluid of a gas turbine is utilized to produce steam for a steam turbine, which comprises the steps of preheating condensate flowing in a water-steam loop of the steam turbine; returning a first quantitative fraction of the preheated condensate in a loop for further preheating; and evaporating a second quantitative fraction of the preheated condensate.

An especially simple mode of operation is thereby achieved without employing a feedwater tank. Moreover, because of the identity of the condensate quantity and the feedwater quantity, a heretofore conventionally provided feedwater supply system with corresponding temperature, quantity and pressure adjusting, as well as monitoring of these parameters, is dispensed with, in accordance with the invention of the instant application. In contrast with the foregoing method of the prior art, in order to adjust and monitor the quantity of condensate to be recirculated, as well as to adjust and monitor the condensate temperature, the partial quantity or quantitative fraction of preheated condensate conducted per unit time in the loop is merely varied accordingly.

In accordance with another mode, the method according to the invention includes performing the evaporating step in at least two pressure stages, and supplying preheated condensate to each of the pressure stages.

In accordance with a further mode of the method according to the invention, the steps of preheating the condensate and evaporating the preheated condensate are performed in a number of circulatory loops corresponding to the number of pressure stages.

In accordance with an added mode, the method according to the invention, includes conducting steam flows of the pressure stages parallel to one another.

Thus, in an advantageous further feature of the method, the evaporation takes place in a plurality of pressure stages, preferably two in number, and each of the pressure stages is supplied with preheated condensate. Alternatively, the preheating of the condensate and the evaporation of the preheated condensate can each take place in a number of loops corresponding to the number of pressure stages. In either case, the steam flows of the various pressure stages are advantageously parallel to one another.

In accordance with another aspect of the invention, a gas and steam turbine system assembled without a feedwater tank and having a gas turbine and a steam turbine, a steam generator connected to the gas turbine downstream therefrom, as viewed in a fluid flow direction through the system, the steam generator having heating surfaces incorporated into a water-steam loop of the steam turbine, comprising a condenser located downstream from and connected to the steam turbine, at least one condensate preheater having an inlet side connected directly to said condenser for directly receiving supplied condensate therefrom, and having an outlet side, and a recirculating pump, means for evaporating the condensate, and means for connecting the outlet side of the one condensate preheater, on the one hand, via the recirculating pump to the inlet side of the one condensate preheater and, on the other hand, to the evaporating means.

In accordance with another feature of the invention, the evaporating means include a low-pressure evaporator and a high-pressure evaporator, the connecting means connecting the outlet side of the condensate preheater both to the low-pressure evaporator and, via a high-pressure pump, to the high-pressure evaporator.

In accordance with a further feature of the invention, the system has a plurality of different pressure stages, and a plurality of the condensate preheaters are provided corresponding in number with the number of the different pressure stages, each of the condensate preheaters communicating at the outlet side thereof with the inlet side thereof, and with a respective evaporator of a respective one of the pressure stages.

In accordance with an added feature of the invention, the plurality of pressure stages constitute two pressure stages.

In accordance with an additional feature of the invention, the plurality of condensate preheaters are disposed within the steam generator in a region of like flue gas temperature.

In accordance with a concomitant aspect of the invention, there is provided a gas and steam turbine system assembled without a feedwater tank, and having a gas turbine and a steam turbine, wherein heat contained in a pressure-relieved operating fluid of the gas turbine is utilized to produce steam for the steam turbine, comprising means for preheating condensate flowing in a water-steam loop of the steam turbine; means for returning a first quantitative fraction of the preheated condensate in a loop for further preheating; and means for evaporating a second quantitative fraction of the preheated condensate.

Thus, with respect to the gas and steam turbine system according to the invention, which includes a steam generator located downstream of the gas turbine, and having heating surfaces which are connected into a water-steam loop of the steam turbine, at least one condensate preheater is provided which, for the purpose of receiving condensate, is directly connected at an input side thereof, i.e., without any interposition of a feedwater tank or reservoir, to a condenser downstream from the steam turbine. At the output side thereof, the condensate preheater is connected, on the one hand, with its inlet, via a recirculating pump and, on the other hand, with an evaporator.

The condensate preheater, at the outlet side thereof, advantageously communicates both with a low-pressure evaporator and, via a high-pressure pump, with a high-pressure evaporator. Alternatively, a number of condensate preheaters corresponding to the number of different pressure stages, preferably two pressure stages, may be provided. Each of the condensate preheaters thus communicates, at the outlet side thereof, with the inlet thereof and with an evaporator of one of the pressure stages. The condensate preheaters are, furthermore, suitably disposed within the steam generator, a region thereof having a uniform or equal flue-gas temperature.

Other features which are considered as characteristic for the invention are set forth in the appended claims.

Although the invention is illustrated and described herein as embodied in a method for operating a gas and steam turbine system, and a gas and steam turbine system operating by the method, it is nevertheless not intended to be limited to the details shown, since various modifications and structural changes may be made therein without departing from the spirit of the invention and within the scope and range of equivalents of the claims.

Figure 2:
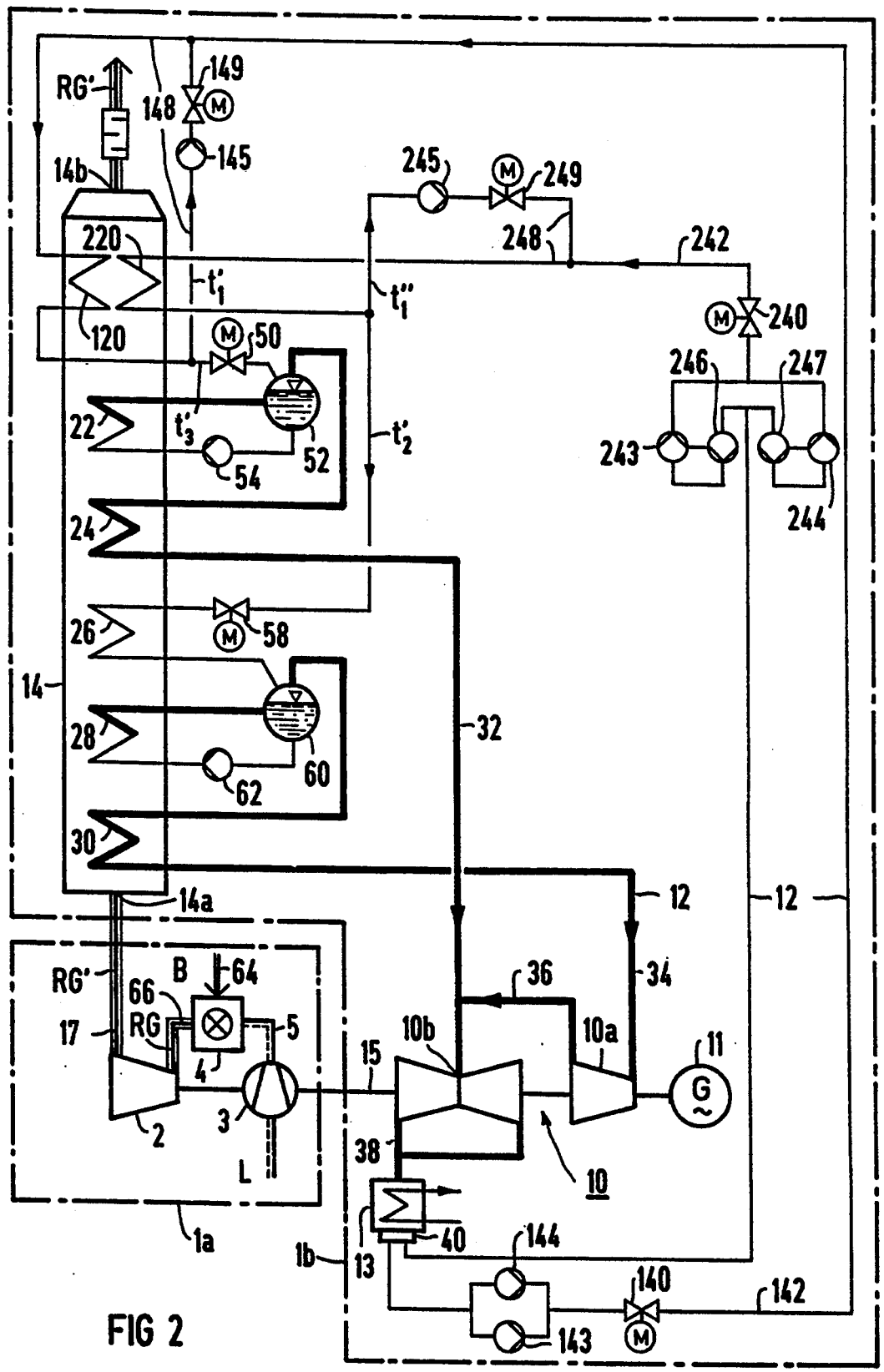

The construction and method of operation of the invention, however, together with additional objects and advantages thereof will be best understood from the following description of specific embodiments when read in connection with the accompanying drawings, in which:

FIG. 1 is a circulatory flow diagram of one embodiment of a gas and steam turbine system according to the invention having two pressure stages with a common condensate preheater; and FIG. 2 is a circulatory flow diagram like that of FIG. 1 of another embodiment of the gas and steam turbine system wherein each of the two pressure stages has one condensate preheater.

Like structural features in both of the figures of the drawing are identified by the same reference characters.

Referring now more specifically to FIG. 1 of the drawing, there is shown therein a gas and steam turbine system which includes a gas turbine system 1a and a steam turbine system 1b. The gas turbine system 1a includes a gas turbine 2 with an air compressor 3 coupled therewith and with a combustion chamber 4 preceding, or located upstream of, the gas turbine 2, as viewed in fluid flow direction through the gas turbine system, and connected to a fresh-air line 5 of the air compressor 3.

The steam turbine system 1b includes a steam turbine 10 with a generator 11 coupled therewith and, in a water-steam circulatory loop 12, a condenser 13 located downstream from the steam turbine 10, in the fluid flow direction in the system 1b, and connected to the steam turbine 10, and a steam generator 14 located upstream of and connected to the steam turbine 10. The gas turbine 2 and the air compressor 3, as well as the steam turbine 10 and the generator 11, are all mounted on a common shaft 15.

The steam turbine 10 is formed of a high-pressure part 10a and a low-pressure part 10b, which drive the generator 11 via the shaft 15.

For conducting the exhaust or flue gases RG' from the gas turbine 2 to the steam generator 14, a gas-turbine exhaust gas line 17 is connected to an inlet 14a of the steam generator 14. The exhaust gas RG' leaves the steam generator 14 via an outlet 14b thereof in a direction towards a non-illustrated chimney.

The steam generator 14 includes a condensate preheater 20 and, in a low-pressure stage, a low-pressure evaporator 22 and a low-pressure superheater 24. In a high-pressure stage, the steam generator 14 also includes a high-pressure preheater or economizer 26, a high-pressure evaporator 28, and a high-pressure superheater 30. The low-pressure superheater 24 communicates via a steam line 32 with the low-pressure part 10b of the steam turbine 10. The high-pressure superheater 30 communicates via a steam line 34 with the high-pressure part 10a of the steam turbine 10. The high-pressure steam-turbine part 10a communicates, at an outlet side thereof, via a steam line 36 with the low-pressure steam-turbine part 10b which, in turn, at an output side thereof, is connected via a steam line 38 to the condenser 13.

The condenser 13, i.e., the hot well 40 thereof, communicates directly with the condensate preheater 20 via a condensate line 42 wherein two parallel-connected condensate pumps 43 and 44 of equal capacity are located redundantly. The condensate preheater 20, at an outlet side thereof, communicates with an inlet thereto, i.e., with the condensate line 42, via a loop 48 wherein a recirculating pump 45 and a control or adjusting element or valve 46 are connected. The condensate preheater 20, at the outlet side thereof, also communicates via a valve 50 with a low-pressure drum 52 which, in turn, communicates via a recirculating pump 54 with the low-pressure evaporator 22, and directly with the low-pressure superheater 24. The low-pressure drum 52 and the evaporator 22, as well as the superheater 24, form the evaporator system of the low-pressure stage.

The condensate preheater 20 also communicates redundantly at the outlet side thereof via two parallel-connected high-pressure pumps 55 and 56 and a valve 58 with the economizer 26 at an inlet side thereof. The economizer 26 communicates at an outlet side thereof with a high-pressure drum 60 which communicates, via a recirculating pump 62, with the high-pressure evaporator 28, and directly with the high-pressure superheater 30. The high-pressure drum 60 and the evaporator 28 as well as the superheater 30 form the evaporator system of the high-pressure stage.

In the course of operation of the gas and steam turbine system 1a, 1b, fuel B is fed to the combustion chamber 4 via a delivery line 64. Combustion of the fuel B with compressed fresh air L from the air compressor 3 takes place in the combustion chamber 4. The hot flue gas RG produced during the combustion is conducted into the gas turbine 2 via a flue gas line 66. The hot flue gas RG expands in the gas turbine 2 and, accordingly, drives the latter, which, in turn, drives the air compressor 3 and the generator 11. The hot flue or exhaust gas RG' discharging from the gas turbine 2 is introduced via the exhaust gas line 17 into the steam generator 14, where it is used to produce steam for the steam turbine 10. To that end, the exhaust gas flow and the water-steam loop 12 are linked together in counterflow.

The steam discharging from the low-pressure part 10b of the steam turbine 10 is fed via the steam line 38 to the condenser 13, where it condenses. The condensate is pumped via the condensate pump or pumps 43 and/or 44 into the condensate preheater 20, where it is preheated. A first quantitative fraction $t_1$ of preheated condensate is returned to the loop 48 for preheating. A second quantitative fraction $t_2$ and a third quantitative fraction $t_3$, respectively, of preheated condensate are fed via the high-pressure drum 60 to the high-pressure evaporator 28, and via the low-pressure drum 52 to the low-pressure evaporator 22.

An adjustment of the quantitative fractions $t_2$ and $t_3$ fed to the evaporator systems per unit of time, and an adjustment of the condensate temperature at the inlet and at the outlet of the condensate preheater 20 are performed by means of the valve 46, the quantitative fraction $t_1$ conducted in the loop 48 being varied accordingly. The quantitative fraction $t_2$, for example, is approximately 80%, and the quantitative fraction $t_3$ is approximately 20% of the available quantity of condensate, while approximately 20% of the condensate, as the quantitative fraction $t_1$, flows continuously in the loop 48. By varying the quantitative fraction $t_1$, the preheating temperature of the condensate can be varied over a wide range.

The embodiment of the gas and steam turbine system 1 illustrated in FIG. 2 differs from the embodiment shown in FIG. 1 only in that two condensate preheaters 120 and 220 are disposed in the steam generator 14 in a region thereof having equal or like flue gas temperature, the two condensate preheaters 120 and 220, for effecting a storage or reservoir-free delivery of condensate, being connected on respective inlet sides thereof directly with the condenser 13. The condensate preheaters 120 and 220, respectively, are connected, at outlet sides thereof, on the one hand, to the respective inlets thereof, each via a respective recirculating pump 145 and 245, and, on the other hand, to the respective evaporator system of the low-pressure and high-pressure stages. In this regard, the condensate preheater 120 is connected to the condenser 13 via a condensate line 142, in which a valve 140 and two redundant, parallel-connected low-pressure feed pumps 143 and 144 are located. The condensate preheater 220 is connected, at the inlet side thereof, to the condenser 13, via a condensate line 242, in which a valve 240 and two redundant, parallel-connected high-speed, high-pressure feed pumps 243 and 244, preceded by respective low-speed backing or fore-pumps 246 and 247, are located. Adjustment of the quantity and temperature of the condensate is effected separately for each pressure stage and, in fact, again via preheating loops 148 and 248, the quantitative fractions $t_1'$ and $t_1''$ conducted in the respective loops 148 and 248 being variable by the respective valves 149 and 249.

Whereas, in the exemplary embodiment of FIG. 1, the preheating of the entire quantity of condensate takes place in the preheater 20 common to both evaporator systems, and only the evaporation of the preheated condensate takes place in two separate cycles, in the exemplary embodiment of FIG. 2, both the preheating of the condensate and the evaporation of the preheated condensate are performed in two separate cycles. Thus, distribution of the condensate to the evaporator systems occurs either before or after the preheating, and in both cases the circulatory loops are joined together upstream of the low-pressure part 10b of the steam turbine 10. Both in the exemplary embodiment of FIG. 1 and the exemplary embodiment of FIG. 2, the preheating of the condensate is effected without a reservoir; a respective first quantitative fraction $t_1$ (FIG. 1) and $t_1'$ and $t_1''$ (FIG. 2) of the preheated condensate being returned for preheating in a respective loop 48 and 148 and 248, and further respective quantitative fractions $t_2$ and $t_3$ (FIG. 1) and $t_2'$ and $t_3'$ (FIG. 2) of the preheated condensate being evaporated. The steam flows of the two pressure stages are mutually parallel in both cases.

Due to the reservoir-free preheating of the condensate, a particularly simple mode of operation of the gas and steam turbine system 1a, 1b according to the invention is achieved, with simultaneously little engineering effort or outlay with respect to regulating the preheating temperature of the condensate and of the quantity of condensate flowing continuously in the water-steam loop 12 during the operation of the system. In order to adjust and monitor the temperature of the condensate at the inlet and outlet of the condensate preheaters 20, 120 and 220, respectively, and also to adjust and monitor a minimum flow rate through these preheaters, only a regulation of the quantitative fractions $t_1$, $t_1'$ and $t_1''$, respectively, of preheated condensate flowing in the respective loops 48, 148 or 248 is required.

In a single-pressure system, the low-pressure evaporator system is omitted, so that the quantitative fraction $t_2$ flowing into the high-pressure evaporator system is equivalent to the total quantity of condensate produced, reduced only by the small quantitative fraction $t_1$.

In a three-pressure system, i.e., with an additional medium-pressure part of the steam turbine 10 and an additional intermediate superheater in the steam generator 14, a third condensate preheater may also be provided, which is then incorporated, in a like or similar manner, into the water-steam loop 12 and disposed in the steam generator 14.

The foregoing is a description corresponding in substance to German Application P 42 26 462.6, dated Aug. 10, 1992, the International priority of which is being claimed for the instant application, and which is hereby made part of this application. Any material discrepancies between the foregoing specification and the aforementioned corresponding German application are to be resolved in favor of the latter.

We claim:

1. A gas and steam turbine system assembled without a feedwater tank and having a gas turbine and a steam turbine, a steam generator connected to the gas turbine downstream therefrom, as viewed in a fluid flow direction through the system, the steam generator having heating surfaces incorporated into a water-steam loop of the steam turbine, comprising a condenser located downstream from and connected to the steam turbine, at least one condensate preheater having an inlet side connected to the condenser for directly receiving supplied condensate therefrom, and having an outlet side, and a low-pressure recirculating pump and a controllable valve, said recirculating pump and said controllable valve being mutually connected in series, means for evaporating the condensate, and means for connecting said outlet side of said one condensate preheater, on the one hand, via said recirculating pump and said controllable valve directly to said inlet side of said one condensate preheater and, on the other hand, to said evaporating means, for adjusting a temperature of the condensate at said outlet side of said condensate preheater by adjusting said controllable valve.

2. The system of claim 1, wherein said evaporating means include a low-pressure evaporator and a high-pressure evaporator, and including a high-pressure pump, said connecting means connecting said outlet side of said condensate preheater both to said low-pressure evaporator and, via said high-pressure pump, to said high-pressure evaporator.

3. A gas and steam turbine system assembled without a feedwater tank and having a gas turbine and a steam turbine, a steam generator connected to the gas turbine downstream therefrom, as viewed in a fluid flow direction through the system, the steam generator having heating surfaces incorporated into a water-steam loop of the steam turbine, comprising a condenser located downstream from and connected to the steam turbine, at least one condensate preheater having an inlet side connected to the condenser for directly receiving supplied condensate therefrom, and having an outlet side, and a recirculating pump, means for evaporating the condensate, and means for connecting said outlet side of said one condensate preheater, on the one hand, via said recirculating pump to said inlet side of said one condensate preheater and, on the other hand, to said evaporating means, wherein the system comprises a plurality of different pressure stages, and including a plurality of said condensate preheaters corresponding in number with the number of said different pressure stages, each of said condensate preheaters communicating at said outlet side thereof with said inlet side thereof, and with a respective evaporator of a respective one of said pressure stages.

4. The system of claim 3, wherein said plurality of pressure stages constitute two pressure stages.

5. The system of claim 3, wherein said plurality of condensate preheaters are disposed within the steam generator in a region of like flue gas temperature.

* * * * *